United States Patent
Chien

(10) Patent No.: US 8,380,613 B2
(45) Date of Patent: Feb. 19, 2013

(54) FROM INDIRECT FINANCE TO DIRECT FINANCE DEBT-CLEARING SYSTEM AND METHOD

(75) Inventor: Yung-Sung Chien, Taipei (TW)

(73) Assignee: Shacom.com Inc., Taipei (TW)

( * ) Notice: Subject to any disclaimer, the term of this patent is extended or adjusted under 35 U.S.C. 154(b) by 0 days.

(21) Appl. No.: 13/073,166

(22) Filed: Mar. 28, 2011

(65) Prior Publication Data

US 2011/0173115 A1    Jul. 14, 2011

Related U.S. Application Data

(63) Continuation-in-part of application No. 12/170,422, filed on Jul. 9, 2008, now abandoned.

(51) Int. Cl.
*G06Q 40/00* (2012.01)

(52) U.S. Cl. ............. 705/37; 705/38; 705/36 R; 705/40; 705/35; 705/1.1

(58) Field of Classification Search .................. 705/1.1, 705/37, 38, 40, 36 R, 35, 67, 69, 41, 54; 385/24; 369/918, 918.1; 235/379

See application file for complete search history.

(56) References Cited

U.S. PATENT DOCUMENTS

| 6,233,566 | B1 * | 5/2001 | Levine et al. | 705/36 R |
| 2004/0267647 | A1 * | 12/2004 | Brisbois | 705/35 |
| 2008/0270320 | A1 * | 10/2008 | Chien | 705/36 R |

OTHER PUBLICATIONS

Steven Marjanovic; "Despite Doubts, More Banks Offer Web Auction Action"; American Banker; Coctober 21, 1000. vol. 164 issue 203, p. 1, 2p.*

* cited by examiner

*Primary Examiner* — John H Holly
(74) *Attorney, Agent, or Firm* — Ming Chow; Sinorica, LLC

(57) ABSTRACT

A from-IDF-to-DF debt-clearing system and method is disclosed. Internet technology is used to construct a direct-finance fund trading platform, whereby a debtor can raise a fund to clear his debts, especially the debts of credit cards and fiduciary loans. After receiving an application of a debtor, the direct-finance fund trading platform analyzes the credit condition and debt-clearing requirement of the debtor and then assigns a bridge loan to the debtor. After delivering the bridge loan, the platform enters into a fund-trading module to bid for the debtor and clears the bridge loan with the obtained fund, and the debtor pays a contribution amount to the platform periodically.

21 Claims, 4 Drawing Sheets

FROM INDIRECT FINANCE TO DIRECT FINANCE DEBT-CLEARING SYSTEM AND METHOD

The present invention is a continuation-in-part application of the application that is entitled "FROM INDIRECT FINANCE TO DIRECT FINANCE DEBT-CLEARING SYSTEM AND METHOD" (Application NO.: U.S. Ser. No. 12/170,422), which was filed on Jul. 9, 2008, now abandoned and which is used herein for reference in its entirety.

BACKGROUND OF THE INVENTION

1. Field of the Invention

The present invention relates to financial systems. More particularly, the present invention makes use of the high efficiency potential of direct finance to afford debtors a debt-clearing method, wherein Internet technology is used to construct a direct-finance fund-trading platform, whereby debtors can raise funds to clear debts, especially the debts of credit cards and fiduciary loans, and whereby the problem of high interest rate-induced poor repayment ability is overcome.

2. Description of the Related Art

On Jun. 8, 2007, Taiwan Legislative Yuan approved "Debt-Clearing Regulations for Consumers", which is to raise debt-clearing volition of debtors and decrease bad debts for banks via legislatively restricting some debtors' personal freedom but exempting debtors from part of their debts. However, the legislative way to solve commercial problems will leave debtors a lifelong mark of poor credit. For banks, the interference from political power not only damages their claims but also lowers the velocity of fund circulation. Thus is created a vicious circle where the loaner is afraid of loaning and it is difficult for a borrower to borrow.

The promoter of Grameen Bank, Dr. Muhammad Yunus, the winner of a 2006 Nobel Prize and the most successful executor among microfinance banks, brought up an idea "Poverty cannot be solved with subvention but should be resorted to commercial ways" when he refused help from the World Bank to his low interest rate loan business. The present invention aims to solve the commercial problem with a commercial way, which can regenerate debtors' living and life without the penalties of credit degradation and restriction on the freedom of living, thus achieving the optimally efficient application of social resources. Thus, the present invention proposes a from-IDF-to-DF (from indirect finance to direct finance) debt-clearing system and method to make the best of the high efficiency advantage of direct finance to solve debt problems.

A U.S. Pat. No. 6,098,052 disclosed a "Credit Card Collection Strategy Model," which constructs a computerized strategy model for the analysis and recovery of bad debts to learn the cost and gain of collecting a specified bad debt and determine whether there is profit to collect the bad debt. However, the prior-art patent cannot promote the willingness to clear bad debts but can only analyze the cost and gain of collecting a bad debt. In other words, the model cannot raise the recovery rate of bad debts.

A U.S. Pat. No. 7,191,150B1 disclosed an "Enhancing Delinquent Debt Collection Using Statistical Models of Historical Information and Account Events," which constructs a statistic method to calculate the probability and percentage of the repayment of a delinquent debt. However, the prior-art patent cannot promote debtors' repayment willingness and ability but can only raise the accuracy in credit analysis.

A US patent of Publication No. US2004/0073504A1 disclosed a "Systems and Methods for Increasing Recovery Rates on Delinquent Financial Accounts," which reopens the accounts that have been closed after the bad debts thereof had been processed and respectively modifies the repayment contracts with different debtors according to their conditions. If the customer is still unable to repay his debt, his account will be closed to reduce the risk of the bank. However, the prior-art patent still solves problems with the conventional indirect-finance means, such as reducing the repayment amount, decreasing the interest rate, or increasing the loan amount of a debtor's new loan repaying previous loans.

All the three abovementioned prior art have their own restrictions and do not break through the conventional debt-clearing solutions. Especially, the first and second prior arts are not indeed to help debtors clear their debts but lay stress on the solutions of engineering problems. As to the third prior art, it does not renovate but adopts the conventional indirect-finance ways, such as reducing the repayment amount of debts and increasing the loan amounts, to help debtors clear their debts.

Accordingly, the present invention proposes a from-IDF-to-DF (from indirect finance to direct finance) debt-clearing system and method to solve the abovementioned problems. The present invention creates a high-efficiency environment for depositor and borrower parties and greatly reduces the interest rate to promote debtors' willingness and ability to clear their debts. Therefore, the present invention has obvious improvements over the prior art.

SUMMARY OF THE INVENTION

The present invention has the following objectives:

1. Regenerating debtors' living and life: The interest rates, particularly the interest rates of credit cards and fiduciary loans, are so high that it is hard for debtors to clear their debts despite their willingness. According to the "Debt-Clearing Regulations for Consumers", a debtor cannot solve his debt unless he files for bankruptcy. However, bankruptcy will greatly impact the credit and life of debtors. The present invention promotes debtor's willingness to clear his debt via reducing the interest rate, and a debtor can use the direct-finance fund-raising mechanism of the present invention to clear his old debt with his dignity unscathed.
2. Reducing banks' overdue loans: Via the present invention, debtors can repay debts with lower interest rates. Therefore, the repayment ability of debtors is greatly promoted, and the willingness of clearing debts is also obviously enhanced. Thus, the ratio of overdue loans is greatly reduced.
3. Promoting the efficiency of fund operations: The "Debt-Clearing Regulations for Consumers" indeed intends to solve the problems of debtors. However, a solution that political power forcibly meddles with commercial behaviors does harm the economical operation of free market. The present invention uses Internet technology to develop an e-commerce module, which fully exploits the efficiency drop between direct finance and indirect finance to help debtors, promote fund operation efficiency and facilitate social stabilization.
4. Creating game rules for direct-finance depositor-borrower integration: The present invention uses a fund-raising module to match depositors and debtors to eliminate the inefficiency of the go-between operations by traditional banks (indirect finance) and realize direct finance. The direct-finance depositor-borrower integration enables an immediate contact between depositors and borrowers, whereby depositors can earn a higher interest rate and the borrowers can borrow with a lower interest rate.

5. Increasing fund-acquiring efficiency through the Internet: The present invention is an electronic commercial system, whereby participants can trade via an electronic commercial website, whereby participants do not need to go to a bank and contact the clerk personally, and whereby their time and money is saved.

To achieve the abovementioned objectives, the present invention proposes a from-IDF-to-DF (from indirect finance to direct finance) debt-clearing system, which comprises an administrating server linking to users via a communication system or network and providing a user interface for the users. The administrating server can exchange information with users in a safe environment in real-time. When applicants apply for membership and input their personal information, the administrating server analyzes the input information to get the attributes of members and classifies the members according to their attributes. The administrating server also takes charge of monitoring and controlling the process of credit enhancement, the process of assigning bridge loans, and the process of making bidding authorization contracts, performing matching in fund raising pools, undertaking biddings in a fund-raising module and executing settlement and delivery procedures. The system of the present invention comprises a database storing the information for the abovementioned operations, the results and the updated data thereof. The system of the present invention further comprises the following modules:

A membership application module: The administrating server uses the membership application module to process the personal data input by a user and verify whether the user qualifies for membership. The information is stored in the database. When the user logs into the system later, the membership application module will retrieve the information to check.

A member classification module: The administrating server uses the member classification module to analyze the fundamental data and financial states of members and classify the members into debtor members and general members. Then, the administrating server calculates the amount of bridge loans and the affordable monthly contribution amount for debtor members and stores the information in the database.

A credit enhancement module: The debtor member may choose to provide collateral or a guarantor; the credit enhancement module will monitor and control the collateral/guarantor submission process and store the information into the database.

A bridge loan processing module: The administrating server uses the bridge loan processing module to monitor and control a debtor member making a bidding authorization contract and a bridge loan contract. When informed that the bridge loan contract and the bidding authorization contract has been done, the bridge loan processing module assigns a bridge loan to the debtor member to immediately clear the debtor member's old debt and stores the information into the database.

A member and pool matching module: The administrating server uses the member and pool matching module to allocate a debtor member to an appropriate fund-raising pool according to the amount of the bridge loan and the affordable monthly contribution amount and stores the information into the database.

A fund-raising module: The administrating server uses the fund-raising module to raise funds for clearing debts. The administrating server uses the fund-raising module to process the information about a member's bid price and determine whether to accept the member's bid price until the member wins the bid or withdraws from the bidding. Then, the fund-raising module stores the information into the database.

A settlement and delivery module: The administrating server uses the settlement and delivery module to process settlement and delivery for bid-winners and non bid-winners and then stores the information into the database.

In the from-IDF-to-DF debt-clearing system of the present invention, an administrating server links to members via communication systems or networks and provides a specific webpage linking to members' devices. The method of the present invention comprises the following steps: the system accepts a user to input his personal information in the webpage of the system, examines the user's qualification and provides an account number and a password for the user if the user qualifies for membership; the system analyzes the user's attributes, credit and financial data and determines whether the user is a general member or a debtor member; the system instructs a debtor member to provide a guarantor or collateral and demands him sign a bidding authorization contract and a bridge loan contract; after accepting the information that the guarantor or collateral has been received and the contracts have been signed, the system introduces the assignee of the debtor member to attend an appropriate fund-raising pool according to the amount of the bridge loan and the affordable monthly contribution amount; the system executes a procedure that assignees and general members bid simultaneously; after completing a bidding, the system appropriates a fund to a general-member bid-winner and collects deposits from non bid-winners among general members; for a debtor-member bid-winner, the system directly clears his bridge loan with the received fund; for non bid-winners among debtor members, the system converts the current amortizations for their bridge loans into their deposit funds.

DETAILED DESCRIPTION OF THE INVENTION

Below, the embodiments are described in detail to exemplify the present invention.

Figure 1:
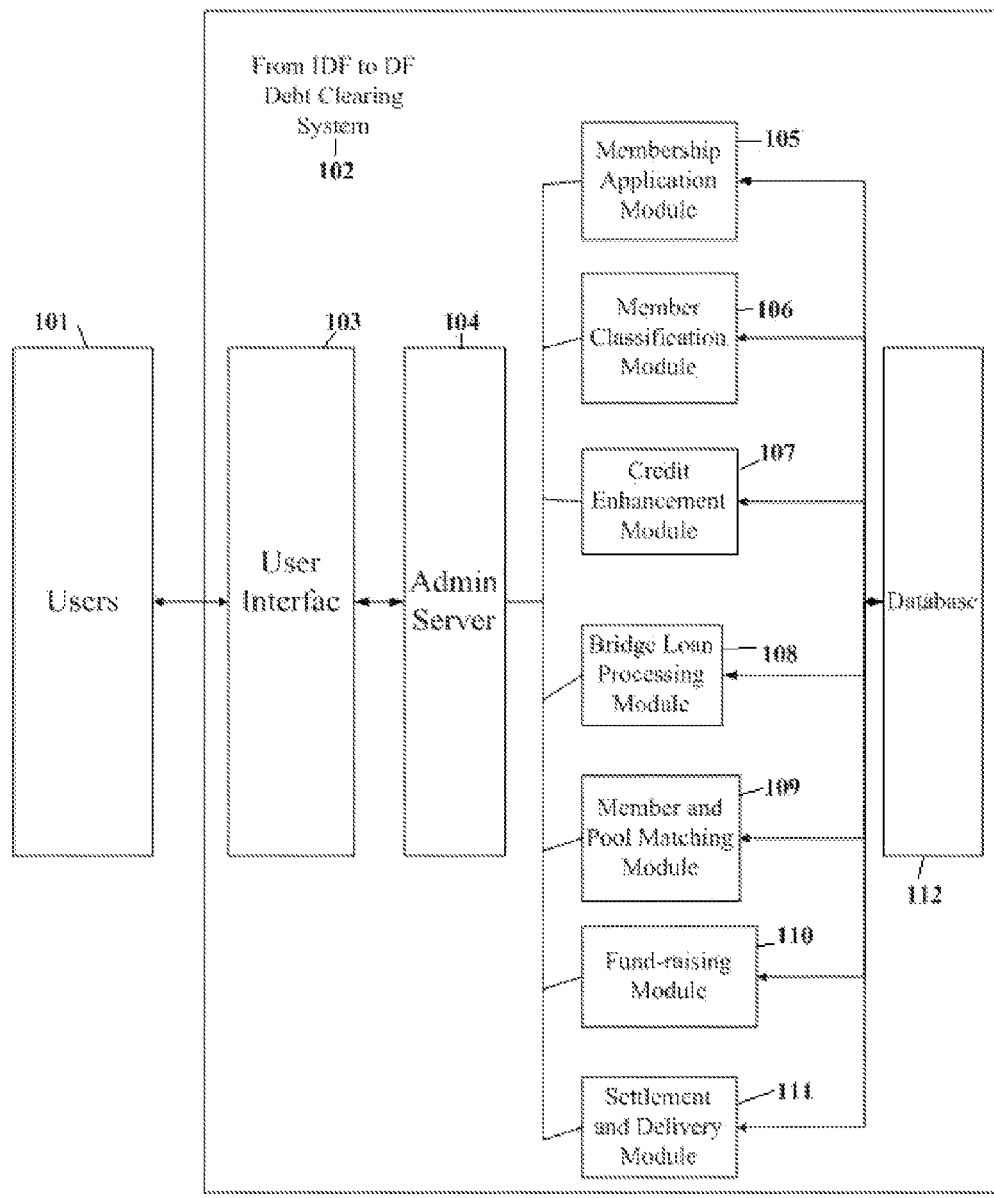
FIG. 1 is a diagram illustrating a from-IDF-to-DF debt-clearing system according to an embodiment of the present invention.

Refer to FIG. 1, which is a diagram schematically showing a from-IDF-to-DF debt-clearing system according to an embodiment of the present invention. The system 102 of the present invention comprises an administrating server 104. Via networks, wired communication devices or wireless communication devices, users 101 may use computers, mobile phones, PDA, etc., to link to a user interface 103 of the administrating server 104 and the administrating server 104 itself. The administrating server 104 in real-time can safely exchange information with members via communication networks, wired communication devices, or wireless communication devices. The administrating server 104 also links to a database 112 and several modules and stores data, information and results into the database. In the present invention, the from-IDF-to-DF debt-clearing system 102 further comprises the following modules:

A membership application module 105: The membership application module 105 examines the fundamental data of a user and verifies whether the user qualifies for membership. Then, the administrating server 104 calculates, processes, analyzes and cross-checks the data and executes the results and then stores the information in the database 112.

A member classification module 106: The member classification module 106 analyzes the fundamental data, credit record and financial state of a member, classifies the member into a debtor member or a general member and calculates the amount of the bridge loan the member can acquire. Then, the administrating server 104 calculates, processes, analyzes and cross-checks the data and executes the results and then stores the information in the database 112.

A credit enhancement module 107: The debtor member may choose to provide collateral or a guarantor; the credit enhancement module will monitor and control the collateral/guarantor submission process; and the credit enhancement module 107 will process and examine the personal data of the guarantor. Then, the administrating server 104 calculates, processes, analyzes and cross-checks the data and executes the results and then stores the information in the database 112.

A bridge loan processing module 108: The bridge loan processing module 108 determines the amount of bridge loans, instructs the debtor member to make a bidding authorization contract and a bridge loan contract, and monitors and controls the process of signing the contracts. Then, the administrating server 104 calculates, processes, analyzes and cross-checks the data and executes the results and then stores the information in the database 112.

A member and pool matching module 109: The member and pool matching module 109 allocates a debtor member to an appropriate fund-raising pool according to the amount of the bridge loan and the affordable contribution amount in each term. Then, the administrating server 104 calculates, processes, analyzes and cross-checks the data and executes the results and then stores the information in the database 112.

A fund-raising module 110: The fund-raising module 110 operates the bidding platform, analyzes the bid prices, and decides the bid-winner The administrating server 104 uses the fund-raising module 110 to raise debt-clearing funds. Then, the administrating server 104 calculates, processes, analyzes and cross-checks the data and executes the results and then stores the information in the database 112.

A settlement and delivery module 111: The settlement and delivery module 111 issues bridge loans, settles the bidding results, issues bridge loans to clear debts, converts the repayment of bridge loans into deposit funds, and delivers bid-winning funds and deposit funds. Then, the administrating server 104 calculates, processes, analyzes and cross-checks the data and executes the results and then stores the information in the database 112.

As mentioned above, the database 112 stores the results of calculation, processing, analyzing, cross-checking, and execution by the administrating server 104. The administrating server 104 and the abovementioned modules also retrieve data from the database 112 to calculate, process, analyze, cross-check and execute.

Figure 2:
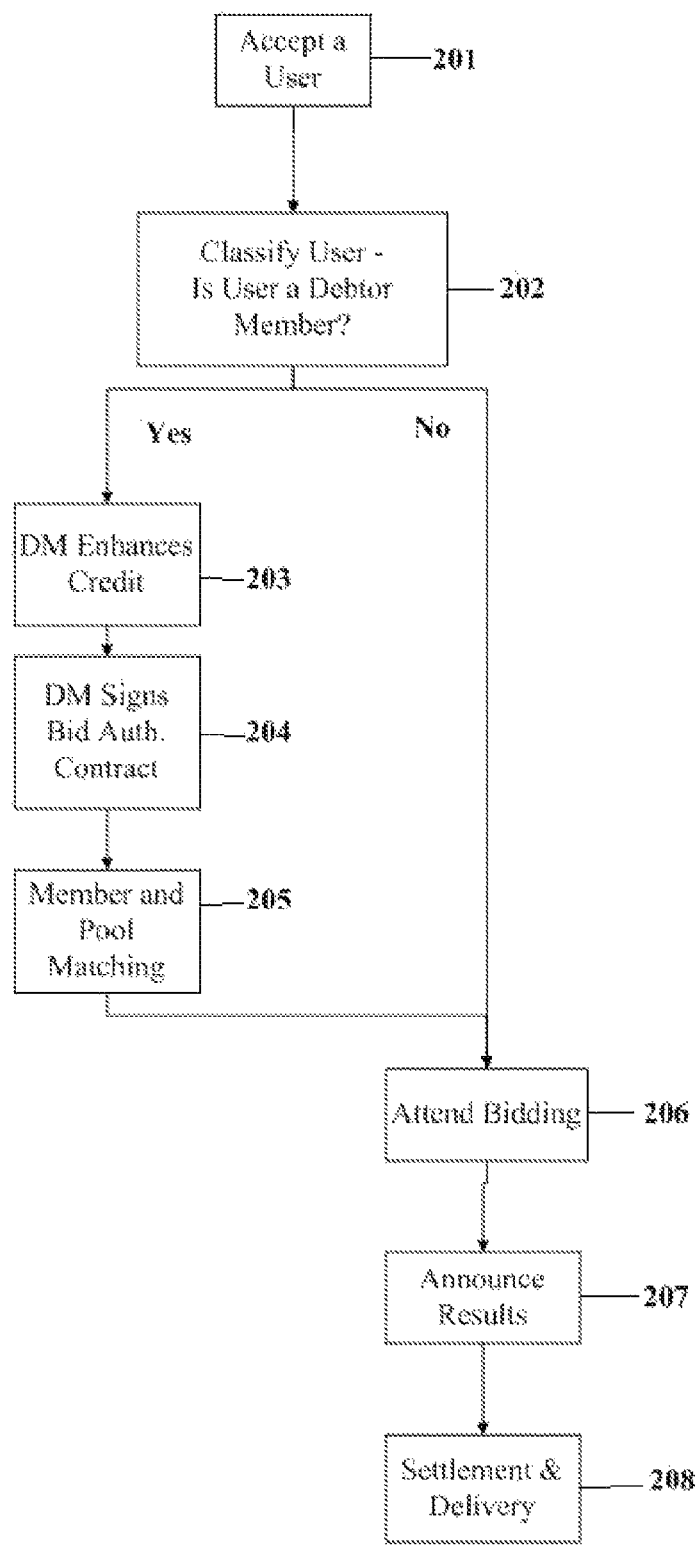
FIG. 2 is a flowchart of a from-IDF-to-DF debt-clearing method of fund-raising through bidding according to an embodiment of the present invention.

Refer to FIG. 2, which is a flowchart of a from-IDF-to-DF debt-clearing method according to an embodiment of the present invention. The method of the present invention comprises the following steps: the from-IDF-to-DF debt-clearing system accepts a user as a member of the system (step 201); the system examines the member's data and classifies the member according to the member's attributes (step 202) to determine whether the member is a general member or a debtor member; if the member is a general member, the system allows the general member to directly attend biddings (step 206); if the member is a debtor member, the system demands the debtor member provide a guarantor or collateral to enhance his credit (step 203); after accepting the information that the credit has been enhanced, the system instructs the debtor member to sign a bidding authorization contract and a bridge loan contract (step 204); the system performs member and pool matching for the debtor member according to the amount of the bridge loan and the affordable monthly contribution amount of the debtor member (step 205) and instructs the assignee of the debtor member to attend the bidding activities of appropriate fund-raising pool (step 206); after having executed a procedure that debtor members and general members attend the bidding activities simultaneously, the system announces the results (step 207) and undertakes settlement and delivery (step 208).

Figure 3:
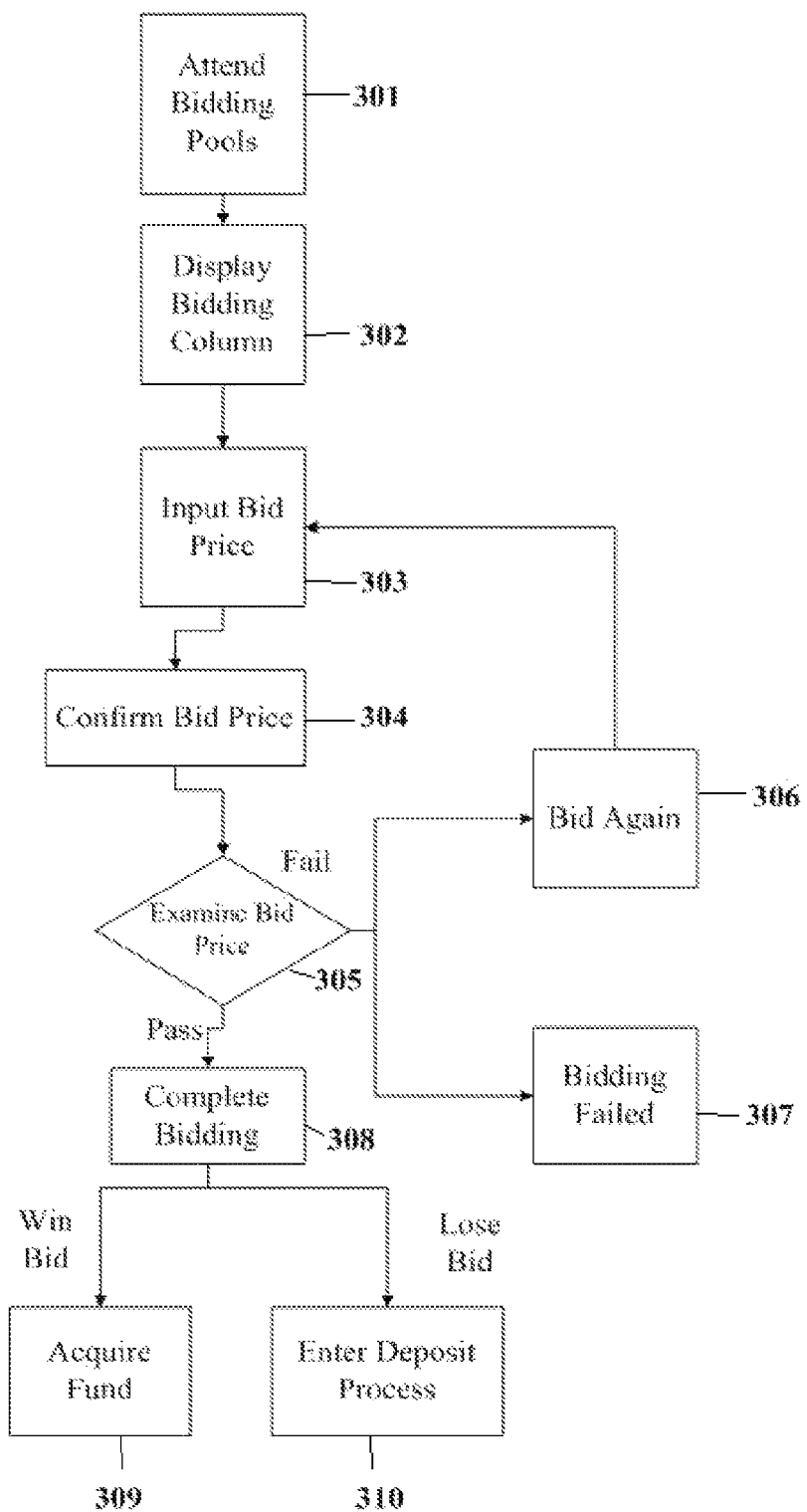
FIG. 3 is a flowchart of a process that the assignee of a debtor member attends a bidding activity according to an embodiment of the present invention.

Refer to FIG. 3, which is a flowchart of a fund-raising process through bidding. Firstly, the system receives the information that an assignee intends to participate in the biddings of fund-raising pools (step 301). Next, the system presents a bidding column on the interface (step 302). Next, the assignee inputs a bid price (step 303), and the system receives the bid price. Next, the system instructs the assignee to re-enter the bid price for confirmation (step 304). Next, the system reads and examines the bid price (step 305). If the bid price does not pass the examination of the system, the system provides the member with two selections: abandoning bidding or bidding again. If the member chooses to abandon bidding, the system will determine that the bid price has expired, and the bidding action thus fails (step 307). If the member chooses to bid again (step 306), the process returns to the step 303. If the bid price passes the examination of the system, the bidding procedures are completed (step 308). Then, the system determines a bid-winner and informs the bid-winner that the bid-winning fund will be used to repay the bridge loan (step 309). Also, the system informs non bid-winners to enter into a deposit process (step 310).

Figure 4:
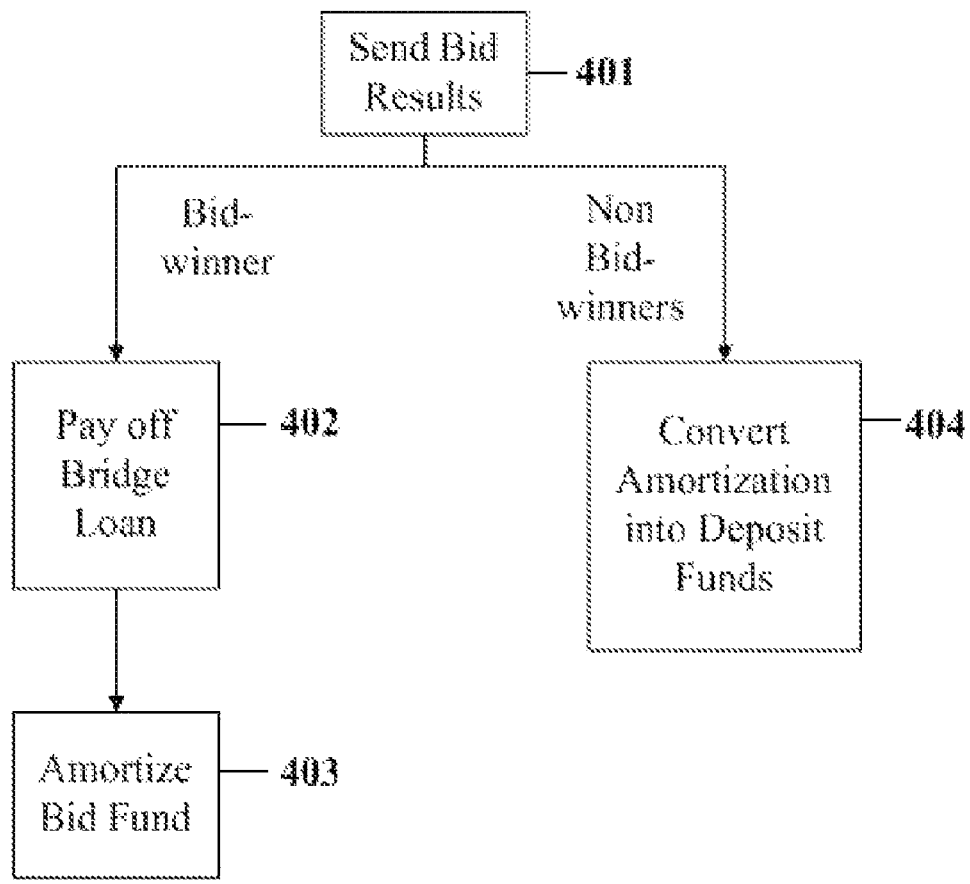
FIG. 4 is a flowchart of a process performing settlement and delivery for a debtor member according to an embodiment of the present invention.

Refer to FIG. 4, which is a flowchart of a settlement and delivery process for a debtor member. Firstly, the system transmits the bidding results to the bid-winner and the non bid-winners (step 401). Next, the system directly pays off the bid-winner's bridge loan with the funds from the bid-winning activity (step 402). In the latter terms, the system will instruct the bid-winner to amortize the bid-winning fund (step 403). Also, the system converts the current amortizations for the bridge loans of the non bid-winners into their deposit funds (step 404).

Below, an example is used to demonstrate an embodiment of the present invention. Note that the figures used in the example are in New Taiwan Dollars (NT$)

Mr. A is a junior professional. Mr. A has an income of NT$36,000 and has an average balance of over NT$10,000 monthly after deducting rent, utility bills, living expense, etc. However, Mr. A had been careless in his consumption. While he was a student, he used his cash cards and credit cards to buy his motorcycle, TV games and famous-brand items amounting to more than NT$400,000. Mr. A worked hard part-time to pay his debts at that time but he still had an uncleared debt of NT$300,000 when he graduated. Although Mr. A had a stable salary income later, it was still hard for him to pay off all the debts in a single payment because he had no savings. Also, although Mr. A was a professional having a stable income and had a strong willingness to clear the debts, it was still hard for him to afford the payment. Therefore, Mr. A could not help being declassed into a credit card slave under the pressure of the payment demand from the shark-like credit card bank and a super high compound credit card interest rate of 19.71%.

Later, Mr. A casually heard about a novel financial product—a "from-IDF-to-DF Debt-Clearing System and Method" invented by Shacom.com, Inc. and popularized by some banks, which helps a stable-income debtor to amortize his debt, particularly to help a person with a stable income to amortize his debt at a rational interest rate so that the person can be free from a high interest rate or compulsory delivery of the principal and interest in a single payment. On hearing the news, Mr. A immediately attended the system of the present invention to escape from being a credit card slave as soon as possible.

Firstly, Mr. A applied online for membership of the platform of the system of the present invention, and the platform examined and approved his application. Next, Mr. A input related data, such as his background, the sum of his debts, his payment ability per month, affordable interest rate range, etc. Next, the platform analyzed the attributes of Mr. A and concluded that Mr. A had debts amounting to NT$300,000 and could afford a NT$10,000 amortization per month. Thus, the platform performed matching and introduced Mr. A to attend a 36-term fund-raising pool (the interval for one term is one month, and the period is three years). As Mr. A just started his professional career and had no savings, the platform would take too high a risk to make a pure unsecured loan to Mr. A. Therefore, the platform demanded Mr. A enhance his credit to insure that the loan can be repaid. The platform provided three ways to enhance credit: guarantor, real estate mortgage, and personal property mortgage.

Thus, Mr. A asked his aunt to be a guarantor, and she agreed. Then, the platform discussed with Mr. A about the sum for clearing his debts and the loan condition and concluded that the platform would loan Mr. A NT$300,000 with a 10% annual interest rate. Then, the platform and Mr. A negotiated that Mr. A was to be introduced to a 36-term fund-raising pool of a NT$10,000 amortization and that the bank would convert the loan amount into a bidding target to bid for Mr. A.

After all the preparing processes were completed, the platform would issue NT$300,000, the so-called bridge loan herein, to clear credit debts for Mr. A. In this stage, the platform would directly remit the money of the bridge loan to the loaner banks of credit cards for Mr. A. Then, the debtor-creditor relationship would be transferred to between Mr. A and the platform. Thus, the platform directed Mr. A to the above-mentioned fund-raising pool and bid with a price of NT$1,391—equivalent to an annual interest rate of 10%.

According to the operational mechanism of the fund-raising pools, the receivable Mr. A could acquire from a fund-raising pool was worked out from the following two equations:

The receivable in the nth term:

$$An=(U-In)\times((N-n))+(U\times(n-1)),\qquad\text{Equation 1}$$

wherein
An denotes the total receivable of the nth term bid winner;
U denotes the contribution amount;
N denotes the number of the total terms;
n denotes the order of the current term;
In denotes the highest bidding price in the nth term;
U-In denotes the amount of deposit of non-bid winners;
U denotes the amount of payment of bid winners in the previous terms; or $$An = (U\times(N-n)) + (U\times(n-1)) + \sum_{i=1}^{n-1} Ii, \qquad\text{Equation 2}$$

wherein An denotes the total receivable of the nth term bid winner,
U denotes the contribution amount,
N denotes the number of the total terms,
n denotes the order of the current term,
In denotes the bid price in the nth term, which means the interest a member having bid effectively and completed bidding in a fund-raising pool is willing to pay in each term;
U denotes the amount of payment of non-bid winners in the previous terms;
In denotes the bidding amount of bid winners in the nth term;
U+In denotes the amount of payment of bid winners in the previous term Suppose the platform bid with a price of NT$1,391 for Mr. A in the first term and won in the bidding. According to Equation 1, the fund the platform (i.e. Mr. A) could acquire from the fund-raising pool is:

(NT$10,000−NT$1,391)×(36−1)+NT$10,000×(1−1)
=NT$301,315.

After the bidding result was announced, the platform acquired NT$301,315 with a bid price of NT$1,391. Next, the platform directly took NT$300,000 therefrom to clear the bridge loan of Mr. A. The platform also delivered the redundant NT$1,315 to Mr. A. Then, Mr. A had to pay the contribution amount NT$10,000 periodically (each month) to the fund-raising pool of the platform until the thirty-sixth term. Thus, Mr. A easily cleared all his debts and escaped from being a credit card slave with a new life in front of him.

However, if Mr. A does not win the bidding in the nth term, say in the case that Mr. B wins the bidding by the bidding price of $1,500 (In), then Mr. A has to deposit $8,500 (U−In =$10,000−$1,500) in the pool of fund-raising. Mr. A keeps continues to bid until he wins the bid, wherein the bidding fund will be used to pay back the bridge loan and the interest derived from the first term to the term that he wins the bid.

EXAMPLE 2

Another plausible embodiment is that the payment is the same at $10,000 for Mr. A throughout the total terms no matter whether he is a bid winner or not. However, the difference is that the amount of required interest derived from the principle of the bridge loan grows with how late Mr. A becomes a bid winner throughout the total terms. For instance, if Mr. A is a bid winner in the first term, then the payment of $10,000 for the rest terms becomes the fund of the fund-raising pool. If Mr. A is not a bid winner in the first term, partial monthly payment of $10,000 (U−In) will be funded in the fund-raising pool, and the rest of $10,000 will be used to pay back the bridge loan. Accordingly when Mr. A finally becomes a bid winner, the bid funding will be prioritized to pay back the bridge loan, the interest derived therefrom and the transaction fee, and the rest of the bid funding will be delivered to Mr. A.

According to the equation 2, if the first bid price of $1,000 offered by the platform is higher than the bid prices offered by other members, then Mr. A could be funded:

NT$10,000×(36−1)+NT$10,000×(1−1)=NT$350,000.

Therefore, after the bid price is announced, the platform wins the bid by $1000 and acquires the total funding amount of $350,000. The platform will directly take out $300,000 to pay back the bridge loan that owed by Mr. A and wire the rest $5,000 to Mr. A. Then Mr. A has to the monthly funding of $10,000+$1,000 (U+In)=$11,000 throughout the total 36 terms to clear his debt.

If Mr. A does not win the bid in the nth term, say in the case Mr. B wins the bid by the bidding price of $1200 (higher than the bidding price of Mr. A), Mr. A has to deposit $10,000, an amount equal to the amortized amount of the bridge loan, and continues to bid in the next term until he wins the bid. Thus, the bidding fund, based on the equation 2

$$An = (U \times (N - n)) + (U \times (n - 1)) + \sum_{i=1}^{n-1} Ii,$$

will be used to pay back the bridge loan as well as the interest derived from the first term to the term that he wins the bid.

What is claimed is:

1. A debt-clearing system, comprising:
   a user interface, linking users to said system via a network, said users inputting data into said system;
   a database; and
   an administrating server, connected to said user interface and said database, further comprising:
   a membership application module, temporarily storing data input by said users, and examining said data to verify whether said users qualify for membership;
   a member classification module, retrieving members' data, and classifying members according to attributes of said members;
   a credit enhancement module, calculating whether a member needs to enhance credit, and evaluating collateral or a guarantor;
   a bridge loan processing module, assigning a bridge loan to a member to clear existing debts of said member;
   a member and pool matching module, analyzing conditions of a member, and matching said member with a fund-raising pool;
   a fund-raising module, processing fund-bidding information;
   a settlement and delivery module, settling and delivering funds, and clearing said bridge loan; and
   wherein said database stores data of said platform, and said administrating server retrieves data from said database and stores data into said database;
   said administrating server receives said member or an assignee of said member to participate in a bidding of the fund-raising pool;
   if said member is a non bid-winner of the fund-raising pool, said administrating server transmits a deposit message to collect deposits from said member and from other non bid-winners; and
   if said member is a bid-winner of the fund-raising pool, said administrating server transmits a pay-off message to clear said bridge loan of said member with at least a portion of the bid-winning fund, and to instruct said member to amortize the bid-winning fund in the latter terms; and
   wherein said fund-raising module deals with bidding procedures of fund-raising pools that members and assignees attend, results of bid-price competition determining debtor-creditor relationships.

2. The debt-clearing system according to claim 1, wherein said users link to said user interface via a PDA (Personal Digital Assistant), a personal computer, or a mobile phone, which links to a network by wire or wirelessly.

3. The debt-clearing system according to claim 1, wherein said member classification module classifies members according to member's records in said database, including member's requirement to clear debts, credit condition, income, and ability of providing guarantors or collaterals.

4. The debt-clearing system according to claim 1, wherein said credit enhancement module assigns a loan amount to a debtor member according to data stored in said database, including guarantors and collaterals of said debtor member.

5. The debt-clearing system according to claim 1, wherein said bridge loan processing module calculates loan amounts, performs online personal information confirmation, delivers loaned money, and clears existing debts of debtor members according to outputs of said member classification module and said credit enhancement module.

6. The debt-clearing system according to claim 5, wherein said online personal information confirmation is realized via webcams and electronic signatures.

7. The debt-clearing system according to claim 1, wherein said member and pool matching module matches a member with one or more fund-raising pools and compares results to determine which one of said fund-raising pools said member should attend.

8. The debt-clearing system according to claim 1, wherein said settlement and delivery module performs settlement and delivery businesses for said platform, including delivering said bridge loan, clearing original debts with said bridge loan, receiving and delivering funds for said fund-raising pool, paying off said bridge loan with a fund obtained through bidding.

9. The debt-clearing system according to claim 1, wherein said bidding procedure further comprises steps of:
   members and assignees attending a bidding pool;
   an interface presenting a column for bidding;
   members and assignees inputting bid prices; confirming bid prices; examining said bid prices; and completing bidding.

10. The debt-clearing system according to claim 9, wherein said assignees are individuals, enterprises or financial organizations, which provide bridge loans for debtor members.

11. The debt-clearing system according to claim 9, wherein after providing bridge loans for debtor members, said assignees acquire authorization to bid for said debtor members to raise funds for clearing said bridge loans.

12. The debt-clearing system according to claim 9, wherein although said assignees are authorized by said debtor members to attend said bidding pool, said debtor members are still subjects of rights and obligations in receiving and paying money.

13. The debt-clearing system according to claim 9, wherein if said bid prices do not pass examination, said members or assignees are allowed to continue to bid via entering new bid prices before a deadline for bidding.

14. The debt-clearing system according to claim 9, wherein said bidding includes one or a plurality of bidding activities of a fund-raising pool that general members and assignees attend; a bidder bidding a highest bid price is a bid-winner in a current term, and said bid-winner acquires a fund.

15. The debt-clearing system according to claim 14, wherein said fund-raising pool sets a maximum bid price.

16. The debt-clearing system according to claim 14, wherein said bid-winner acquires a sum of contribution amounts paid by former bid-winners and contribution amounts each deducting said highest bid price of said current term, which are paid by non bid-winners; each non bid-winner has to deposit said contribution amount minus said highest bid price of said current term.

17. The debt-clearing system according to claim 14, wherein if one said assignee wins in said fund-raising pool, said assignee acquires a fund to recover a bridge loan that said assignee loans a debtor member; said debtor member, who acquires said bridge loan to clear debts, pays a contribution amount to said fund-raising pool periodically.

18. The debt-clearing system according to claim 14, wherein if one said assignee does not win in said fund-raising pool, money paid by a debtor member for a bridge loan from said assignee is directly converted into a deposit fund.

19. The debt-clearing system according to claim 1, further comprising steps of:
delivering a bridge loan;
clearing debts with said bridge loan;
depositing bid-winning fund;
receiving said bid-winning fund; and
clearing said bridge loan with said bid-winning fund.

20. The debt-clearing system according to claim 1, comprising steps of:
(a) configuring said administrating server to receive a membership request from a user;
(b) configuring said administrating server to receive a debt message and a credit attribute message from said user if said user becomes a member, said debt message including the amount of current debt;
(c) configuring said administrating server to determine a fund-raising pool based on said debt message and said credit attribute message, and to issue a bridge loan message to clear existing debts of said member;
(d) configuring said administrating server to receive said member or an assignee of said member to participate in bidding said fund-raising pool;
(e) if said member is not a bid-winner of said fund-raising pool, configuring said administrating server to transmit a deposit message to collect deposits from said member and from other non bid-winners; and
(f) if said member is a bid-winner of said fund-raising pool, configuring said administrating server to transmit a pay-off message to clear said bridge loan of said member with at least a portion of said bid-winning fund in step (c), and to instruct said member to amortize the bid-winning fund in the remaining terms.

21. The debt-clearing system according to claim 20, wherein the step (b) further comprises steps of:
(b1) configuring said administrating server to receive a credit enhancement message of said member; and
(b2) configuring said administrating server to renew said credit attribute message of said member based on said credit enhancement message,
wherein said credit enhancement message includes guarantors and collaterals of said debtor member.

* * * * *